Patented Aug. 13, 1940

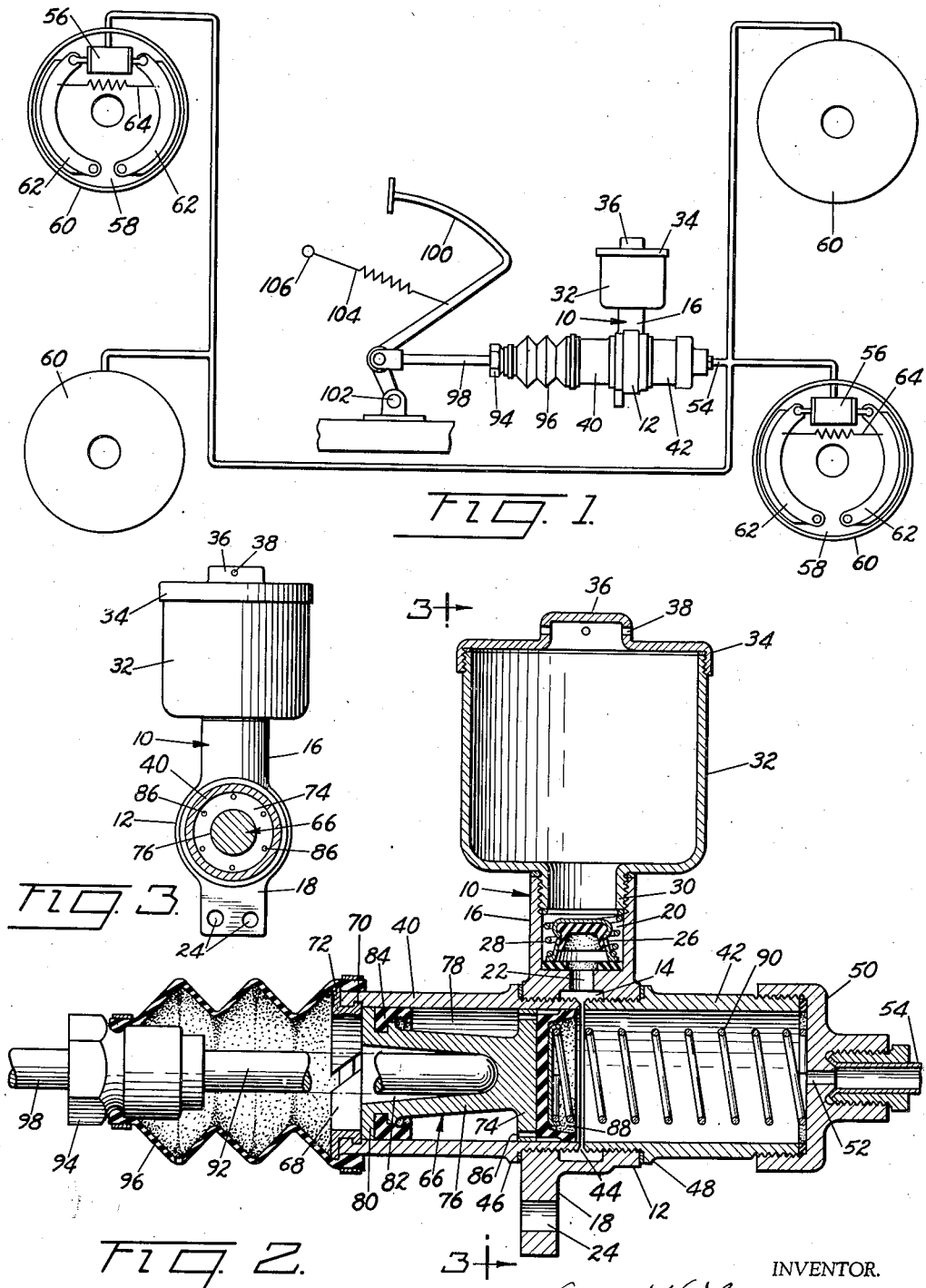

2,211,651

UNITED STATES PATENT OFFICE 2,211,651

FLUID PRESSURE BRAKING SYSTEM

Owen H. Fowler, Detroit, Mich., assignor to Hydraulic Brake Company, Detroit, Mich., a corporation of California Application June 6, 1938, Serial No. 212,180

8 Claims. (Cl. 60—54.6)

This invention relates to fluid pressure braking systems for motor vehicles, and more particularly to fluid pressure producing devices for such systems.

Broadly the invention comprehends a fluid pressure producing device of simplified structure including a coupling having an inner annular groove communicating with a controlled fluid inlet, a pair of aligned cylinders supported by the coupling having their adjacent ends spaced apart so as to provide an extremely narrow gap communicating with the annular groove, and a piston movable in the cylinders for creating pressure.

An object of the invention is to provide a fluid pressure producing device including a chamber, a piston movable therein for creating pressure, and means for maintaining a predetermined constant pressure in the chamber forward of the piston.

Another object of the invention is to provide a fluid pressure producing device having relatively movable parts, a sealing means therefor, and means providing for ingress and egress of fluid so constructed as to avoid injury to the sealing means.

Yet another object of the invention is to provide a fluid pressure producing device including a cylinder divided into two parts, means supporting the parts in spaced relation having a groove communicating with the parts, and a piston movable in the cylinder.

A feature of the invention is aligned cylinders having their adjacent ends supported in spaced relation by a coupling having a passage communicating with the cylinders.

Another feature of the invention is a coupling having an inner annular groove and a boss bored to provide a valve chamber communicating with the groove.

Other objects and features of the invention will appear from the following description taken in connection with the drawing forming a part of this specification, and in which—

Fig. 1 is a schematic view of a fluid pressure braking system embodying the invention.

Fig. 2 is a vertical sectional view of the fluid pressure producing device; and

Fig. 3 is a sectional view substantially on line 3—3, Fig. 2.

Referring to the drawing for more specific details of the invention, 10 represents generally a fluid pressure producing device. The device includes a ring or coupling 12 having an inner annular slot or groove 14, a radial boss 16, and a diametrically disposed flange 18. The boss 16 is bored to provide a valve chamber 20 having a port 22 communicating with the groove 14, and the flange 18 is arranged with one of its sides in a plane common to one edge of the coupling so that the finishing operation may be simplified; and the flange has spaced transverse bores 24 for mounting the coupling on a fixed support.

A two-way valve 26 seated in the bottom of the valve chamber 20 controls the port 22. The valve is yieldingly retained on its seat by a spring 28 interposed between the valve and a sleeve 30 suitably secured in the valve chamber. The sleeve depends from, communicates with, and supports a reservoir 32 having a cover 34 provided with a concentric raised portion 36 apertured as at 38 for venting the reservoir to the atmosphere.

Corresponding cylinders 40 and 42 are mounted respectively in the respective ends of the coupling 12 with their adjacent ends in spaced relation to one another so as to provide a gap 44 of approximately five-thousandths of an inch. This gap provides a suitable communication between the slot or groove 14 in the coupling and the respective cylinders. To insure proper spacing of the cylinders and also alignment thereof, shoulders or flanges 46 and 48 are provided on the cylinders for abutting the respective edges of the coupling 12 with suitable gaskets interposed to effectively seal the joints between the cylinders and the coupling. Preferably the cylinders are bored and bearingized, or otherwise finished, after assembly, as hereinabove set forth.

The cylinder 42 has its outer end closed as by a head 50 provided with a discharge port 52. A fluid pressure delivery pipe or conduit 54 connected to the discharge port has branches connected respectively to fluid pressure actuated motors 56, preferably arranged in pairs, one pair for actuating brakes associated with the front wheels of the vehicle, and another pair for actuating the brakes associated with the rear wheels of the vehicle.

As shown, the brakes are of a preferred type including a fixed support or backing plate 58 adapted to be secured to an axle or to an axle housing, a rotatable drum 60 associated with the backing plate adapted to be secured to a wheel, a pair of corresponding interchangeable friction elements or shoes 62 pivoted on the backing plate for cooperation with the drum, a retractile spring 64 connecting the shoes, and a motor corresponding to the motors 56 mounted on the backing plate between the shoes for actuating the shoes into engagement with the drum against the resistance of the retractile spring.

A piston 66 reciprocable in the cylinders 40 and 42 is held against displacement by a retaining ring mounted in the outer end of the cylinder 40. This retaining ring includes a split band 68 having at one of its edges a narrow outwardly turned rim 70 and its other edge a relatively wide outwardly turned rim 72. The rim 70 is adapted to seat in a groove in the wall of the cylinder 40 adjacent the outer end of the cylinder, and the rim 72 bears against the end of the cylinder and overhangs the periphery thereof to provide suitable means for attachment of a dust shield.

The above described retaining ring, in combination with my fluid pressure producing device, is not claimed in the present application, as it provides the subject-matter of my divisional application No. 316,263, filed January 29, 1940.

The piston 66 includes a head 74, a reduced body portion 76 providing in conjunction with the cylinder 40 and/or 42 an annular chamber 78, and a skirt 80 having therein a concentric socket 82 extended well into the body portion of the piston. The skirt carries a sealing cup 84 for inhibiting seepage of fluid from the annular chamber 78 past the skirt of the piston, and the head 74 has a plurality of passages 86 therethrough providing communications between the annular chamber and that portion of the cylinder 40 and/or 42 forward of the head.

A collapsible sealing cup 88 seated on the head 74 of the piston controls the passages 86, and a spring 90 interposed between the cup and the head 50 of the cylinder 42 serves to retain the cup against displacement and also to return the piston to its retracted position wherein the piston seats on the rim 70 of the split band 68 with its head supporting the sealing cup just back of the gap 44.

A thrust pin 92 has one of its ends seated in the socket 82 in the piston 66, and its other end secured to a coupling 94, connected by a flexible dust shield 96 to the open end of the cylinder 40. The dust shield has a bead snapped over the rim 72 of the retaining band 68. The coupling 94 has attached thereto one end of a thrust rod 98 pivoted to a foot pedal lever 100 rockable on a stub shaft 102 and connected by a retractile spring 104 to a fixed support 106.

In a normal operation, force is applied to the foot pedal lever 100, and this force is transmitted from the lever, through the thrust rod 98 and pin 92 to the piston 66, resulting in movement of the piston on its compression stroke. During the initial movement of the piston on its compression stroke, the sealing cup 88 on the head of the piston closes the gap 44 between the cylinders 40 and 42. This gap is extremely small, and, because of this, injury to the sealing cup as it passes over the gap is avoided, and yet the total area of the gap is ample to provide for free ingress and egress of fluid.

As the piston proceeds on its compression stroke, the fluid in the cylinder 42 forward of the piston is displaced therefrom through the discharge port 52 and fluid pressure delivery pipe or conduit 54 and its branches into the fluid pressure actuated motors 56, causing energization of the motors with the resultant actuation of the respective brakes.

During this operation the piston has moved sufficiently to establish communication between the annular chamber 78 back of the head 74 of the piston and the gap 44. Under this condition, fluid may be drawn from the reservoir 32 into the annular chamber 78. Upon release of the applied force, the piston returns to its retracted position under the influence of the retractile spring 90, and as the piston returns to its retracted position a partial vacuum is created in the cylinder 42 forward of the piston. This results in drawing fluid from the reservoir 32 past the two-way valve 26, through the port 22, the groove or channel 14, the gap 44, into the annular chamber 78, thence through the passages 86 in the head of the piston, past the sealing cup 88, into that portion of the cylinder 42 forward of the piston, completely filling the cylinder.

During this operation, fluid is returning to the cylinder 42 from the fluid pressure actuated motors 56 and the fluid pressure delivery pipe or conduit 54 and its branches connecting the motors to the cylinder 42 under the influence of the retractile springs 64 connecting the shoes of the respective brakes.

Under this condition the cylinder 42 receives a quantity of fluid in excess of its capacity, and this excess quantity of fluid is displaced from the cylinder through the gap 44, the groove 14 and the port 22, past the two-way valve 26 into the reservoir 32. The valve 26 serves to maintain a predetermined pressure on the fluid in the system so that lost motion may be avoided during the initial movement of a subsequent operation.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. A fluid pressure producing device comprising a coupling, cylinders supported by the coupling having their adjacent ends spaced apart to provide a gap, a reservoir communicating with the gap, and a piston reciprocable in the cylinders.

2. A fluid pressure producing device comprising a reservoir, a coupling connected thereto having an internal groove communicating therewith, a valve for control of the communication, cylinders supported by the coupling having their adjacent ends spaced apart to provide a gap communicating with the groove, and a piston reciprocable in the cylinders.

3. A fluid pressure producing device comprising a coupling having an internal annular groove, a chamber on the coupling communicating with the groove, a valve in the chamber controlling the communication, cylinders connected to the coupling having their adjacent ends spaced apart to provide communication between the cylinders and the groove, and a piston reciprocable in the cylinders.

4. A fluid pressure producing device comprising a coupling having an internal annular groove, a supporting flange on the coupling, a boss on the coupling oppositely disposed to the supporting flange, a chamber in the boss communicating with the groove, cylinders connected to the coupling having their adjacent ends spaced apart to provide communications between the cylinder and the groove, and a piston reciprocable in the cylinders.

5. A fluid pressure producing device comprising a coupling having an internal annular groove, a supporting flange on the coupling, a boss on the coupling arranged in oppositely disposed relation to the flange, a valve chamber in the boss communicating with the annular groove, a valve in the chamber controlling the communication, cylinders connected to the coupling having their adjacent ends spaced apart to provide communication between the cylinders and the annular groove, shoulders on the cylinders abutting the ends of the coupling, and a piston reciprocable in the cylinders.

6. A fluid pressure producing device comprising a coupling having an internal annular groove, the ends of the coupling being in parallel relation, a supporting flange on the coupling having one of its sides in a plane common to one end of the coupling, a boss on the coupling in oppositely disposed relation to the supporting flange, a valve chamber in the boss communicating with the annular groove, a valve in the chamber controlling the communication, a reservoir communicating with the valve chamber, cylinders connected to the coupling having their adjacent ends extended into the groove and spaced apart to provide a gap communicating with the groove, shoulders on the cylinders abutting the ends of the coupling determining the width of the gap, a head on one of the cylinders having a discharge port, a piston reciprocable in the cylinders, a sealing cup on the piston resting back of the gap when the cylinder is in retracted position, and means for actuating the piston.

7. A fluid pressure producing device comprising a coupling having an internal annular groove and a chamber communicating with the groove, a valve in the chamber controlling the communication, a reservoir communicating with the chamber, cylinders connected by the coupling having their adjacent ends spaced apart to provide communication between the cylinders and the groove, a head for one of the cylinders having a discharge port, a piston reciprocable in the cylinders, a sealing cup on the piston, a spring interposed between the cup and the head, means supporting the piston when in retracted position with the sealing cup resting just back of the space between the cylinders, and an actuator for the piston.

8. In a fluid pressure system, a fluid pressure producing device including a coupling having an internal annular groove and a chamber communicating with the groove, means for mounting the coupling in a fixed position, a valve controlling the communication, a reservoir communicating with the chamber, cylinders connected by the coupling having their adjacent ends spaced apart to provide communication between the cylinders and the groove, a piston reciprocable in the cylinders, a sealing cup on the piston, and means for actuating the piston.

OWEN H. FOWLER.